(12) United States Patent
Baqar et al.

(10) Patent No.: US 9,094,088 B2
(45) Date of Patent: Jul. 28, 2015

(54) SYSTEMS AND METHODS FOR ACTIVE FREQUENCY TABLE (AFT) GENERATION

(71) Applicant: ROCKWELL COLLINS, INC., Cedar Rapids, IA (US)

(72) Inventors: Sayed Hasan Baqar, Elkridge, MD (US); Michael E. Belt, Huntingtown, MD (US); William George Doyen, Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 147 days.

(21) Appl. No.: 13/832,281

(22) Filed: Mar. 15, 2013

(65) Prior Publication Data

US 2014/0274176 A1    Sep. 18, 2014

(51) Int. Cl.
*H04W 4/00* (2009.01)
*H04B 7/185* (2006.01)

(52) U.S. Cl.
CPC .................................. *H04B 7/18506* (2013.01)

(58) Field of Classification Search
CPC .... G01S 13/951; H04W 40/18; H04W 40/20; H04W 4/028

USPC .................................. 455/430, 431; 342/386
See application file for complete search history.

(56) References Cited

U.S. PATENT DOCUMENTS 8,220,038 B1 *   7/2012  Lucchesi et al. .................. 726/9
2013/0293421 A1 * 11/2013  Bartone ....................... 342/386

* cited by examiner

*Primary Examiner* — Tu X Nguyen
(74) *Attorney, Agent, or Firm* — Ronald E. Prass, Jr.; Prass LLP (57) ABSTRACT

A system and method are provided for generating and/or refining an active frequency table (AFT) for High Frequency Data Link (HFDL) communications, particularly those communications managed by a network of HFDL ground stations. Automated analysis is applied to forecast atmospheric conditions to generate an AFT for the HFDL communication network for one or more particular time windows. Historical analysis of measured atmospheric conditions is consulted to provide an approximation of an AFT. The use of the historical data includes determining, in a past time frame, when an atmospheric conditions most closely compares to the measured or forecast conditions. Reference is then be made to stored information regarding one or more AFTs that were effectively employed in the past time frame under the comparable conditions to generate an appropriate AFT according to the measured or forecast conditions.

21 Claims, 3 Drawing Sheets

SYSTEMS AND METHODS FOR ACTIVE FREQUENCY TABLE (AFT) GENERATION

This application claims priority to U.S. Provisional Patent Application No. 61/753,415, entitled Systems and Methods for Active Frequency Table (AFT) Generation, filed on Jan. 16, 2013, the disclosure of which is hereby incorporated by reference herein in its entirety.

BACKGROUND

1. Field of the Disclosed Embodiments

This disclosure relates to systems and methods for generating and/or refining an active frequency table (AFT) for High Frequency Data Link (HFDL) communications, particularly those communications managed by a network of HFDL sites (ground stations) worldwide.

2. Related Art

High Frequency Data Link (HFDL) is a communications medium used to exchange data between compatible aircraft-installed communication components and a plurality of HFDL ground stations worldwide. HFDL advantageously employs the unique atmospheric propagation characteristics of high-frequency (HF) radio waves and a network of HFDL ground stations to provide data link communications to properly equipped aircraft operating anywhere in the world.

HFDL communications may be provided to aircraft-installed HFDL data radios via a communications management unit that acts as an airborne communications router and interfaces with multiple different aircraft voice and data communication systems, including satellite communications, VHF radio voice and data communications, HF voice communications, HFDL and others. Today, HFDL represents an air/ground data link standard with coverage worldwide. An objective of current HFDL implementations is that participating aircraft are never out of touch either in the air or on the ground.

HFDL has been used for aircraft communications for more than a decade, yet its functionality remains relevant as advances in HFDL ground-based network components and compatible aircraft-mounted avionics systems continue to evolve. Innovations in avionics software developed by a number of aircraft communications companies have led to advances in performance and fidelity of system communications.

ARINC Incorporated continues to invest in its HFDL infrastructure in support of a long-term strategy to ensure ongoing viability of the HFDL communication network system. ARINC, for example, currently has 15 HF ground stations worldwide operating 167 discrete HF frequencies. This HFDL communication network and its associated capacity provide overlap and redundancy in the event of a failure of a particular one of the networked HF ground stations. This network provides nearly complete global coverage, including at both poles, with substantially unbroken system availability rates in support of continuous aircraft communications. HFDL provides an invaluable supplement to other broad based communication systems, including HF voice communications. Because data link communications use significantly less bandwidth than voice communications, HF data may continue to be decoded even in instances when HF voice becomes unusable in a particular region.

SUMMARY OF THE DISCLOSED SUBJECT MATTER

As indicated above, HFDL provides broad-based data communications coverage for aircraft operated worldwide. Many airlines are supported by, and rely upon, worldwide commercial HFDL service to provide high fidelity and uninterrupted data communication between aircraft and the network of HFDL ground stations to provide the broad-based coverage. HFDL communication systems operate in the HF band of frequencies, i.e., in a range of frequencies from approximately 2 MHz to approximately 30 MHz subject to certain limitations.

HFDL finds particular utility as a long range communication medium/scheme based on the propagation of the HF energy. HF energy propagation is facilitated by phenomena that cause HF radio waves to be reflected or refracted off layers in the ionosphere. This capacity for the propagation of the HF energy provides a capability for the radio waves to travel over extended distances, including over the horizon and around the Earth's curvature.

The long range advantages to the use of HF communications in, for example, an HFDL communication system are mediated in some measure by a complex combination of factors. These factors include, but are not limited to: time of day (sunlight/darkness) at an HFDL communication site (generally, as the sunlight gets higher, the frequencies get higher, and conversely, as the sunlight gets lower the frequencies get lower); proximity of the HFDL communication site to a solar terminator; seasonal changes in a vicinity of the HFDL communication site; global sunspot cycles; solar activity (for example, solar mass ejections); polar auroras; and other like environmental, atmospheric and solar phenomena. Additionally, the susceptibility of the HF communications to significant attenuation from any of these environmental, atmospheric or solar conditions may be highly frequency dependent. Those of skill in the art recognize, for example, that a maximum usable frequency may regularly drop below 10 MHz in darkness during the winter months.

Each of the 15 HFDL ground stations may have available to it a number of discrete frequencies, e.g., in a range of 15-20 discrete frequencies on average per ground station, that have been licensed for use by the particular HFDL ground station through appropriate agencies. Some of the discrete frequencies are licensed for use by more than one of the 15 HFDL ground stations.

Because of the changing space weather and other factors, there is an operational need to periodically change frequencies of the HFDL ground stations to maintain high-quality communication between each HFDL ground station and participating aircraft in communication with the each HFDL ground station. For this purpose, a table of frequencies, called an Active Frequency Table (AFT) is routinely developed and forwarded to each of the HFDL ground stations to provide a frequency scheme for the HFDL communication network system to follow in a particular timeframe to provide HFDL communication service. Based on the information entered in the AFT, each HFDL ground station is commanded to change an operating frequency of the one or more HF transmitters and receivers at that HFDL ground station according to the schedule provided in the AFT. In selecting a best propagating frequency, a strict adherence is maintained to the frequency license for the particular HFDL station. In other words, best propagating frequencies cannot be selected at random.

AFTs are loaded and forwarded to the HFDL ground stations on a periodic basis. Conventionally, a weekly schedule for formulation of the AFT and transmission of the AFT to the various HFDL ground stations is followed.

Interruptions of HFDL communication service may be experienced based on non-forecast circumstances that may include, for example, a geomagnetic storm, a solar radiation storm, a radio blackout, other solar activity or a service interruption at a particular HFDL ground station. In such circumstances, an "emergency" or "on-call" AFT may be need to be generated according to the changed circumstances and distributed for use to the HFDL communication network system to account for the non-forecast circumstances.

AFTs were conventionally generated using basic environmental, atmospheric and solar condition forecasting methods based upon, for example, prevailing sunspot numbers and other predictable phenomena to provide a best frequency mix. The HFDL communication network system service has grown. Along with that growth has come a commensurate increase in a requirement for fidelity and continuity in the provided HFDL communications based on increasing aircraft reliance on the availability of the communications. The physical network has also expanded to include additional HFDL ground stations in support of appropriate redundancy in the communication systems introducing additional potential frequency conflicts and interference issues between ground stations. To address these requirements, conflicts and concerns, a desire to provide a higher quality, more responsive real-time frequency management and AFT generation scheme has emerged as an objective to be addressed.

In support of the above objective, it may be advantageous to develop more responsive systems, methods and/or schemes for generating scheduled AFTs based on forecast conditions and emergency or on-call AFTs that may be responsive to unforeseen and emergent changes in forecast conditions and individual system component availability.

Exemplary embodiments of the systems and methods according to this disclosure may apply an automated analysis to forecast environmental, atmospheric, and solar conditions to generate an AFT for the HFDL communication network for one or more particular time windows.

Exemplary embodiments may apply historical analysis to measured or forecast environmental, atmospheric, and solar conditions to provide a best approximation AFT based on those measured or forecast conditions. The historical data may include determining, in some past time frame, when the environmental, atmospheric, and/or solar conditions most closely compared to the measured or forecast conditions. Reference may then be made to stored information regarding one or more AFTs that were effectively employed in the past time frame under the comparable conditions to generate an appropriate AFT according to the measured or forecast conditions.

Exemplary embodiments may input the measured or forecast environmental, atmospheric, and solar conditions in order that an automated system may search for the comparable past time frame conditions and separately search a stored AFT database to find an AFT that was effectively employed during that past time frame under those comparable conditions.

Exemplary embodiments may refine the AFT by applying one or more weighting factors to the basic AFT produced to address only the forecast environmental, atmospheric, and/or solar conditions. The weighting factors may include, for example, a projected aircraft traffic density in a particular region. In this regard, the weighting factors may be applied in a manner that produces a greatest "bang for the buck" in efficiently transmitting data to a largest anticipated population of participating aircraft over a best available frequency for that region in priority over other regions. The weighting factors may also include a total volume of data to be communicated via one or more of the HFDL ground stations in a particular region with an understanding that local costs associated with bulk data transmission via the one or more of the HFDL ground stations may vary from station to station. This weighting factor may seek the most economical pipe through which to send the largest amount of data and prioritize that particular HFDL ground station for frequency selection over some others of the HFDL ground stations.

Exemplary embodiments may apply near real-time data on actual measured HF propagation between participating HFDL ground stations or between any single HFDL ground station on a participating aircraft to at least one of verify or update the AFT based on actual propagation assessment.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for generating and/or refining an AFT for HFDL communication network system operations for communications managed by a network of HFDL ground stations worldwide, will be described, in detail, with reference to the following drawings, in which.

DETAILED DESCRIPTION OF EMBODIMENTS

The systems and methods for generating and/or refining an AFT for HFDL communication network system operations supporting communications managed by a network of HFDL ground stations worldwide, according to this disclosure will generally refer to this specific utility for those systems and methods. Exemplary embodiments described and depicted in this disclosure should not be interpreted as being specifically limited to any particular system configuration, or directed to any particular intended use. In fact, any monitoring and/or control of a frequency-agile communication system including a number of potentially interfering fixed transmission sites that may benefit from the systems and methods according to this disclosure is contemplated.

Specific reference to, for example, any particular fixed ground or mobile airborne communicating device should be understood as being exemplary only, and not limited, in any manner, to any particular class of such devices. The systems and methods according to this disclosure will be described as being particularly adaptable to HFDL communications in which a network of HFDL ground stations are provided with a network-wide frequency plan covering a particular scheduled time frame, the network-wide frequency plan accounting for forecast environmental, atmospheric, and solar conditions, and other operating conditions for the HFDL communication network system, and participating aircraft in communication with the HFDL communication network system.

Figure 1:
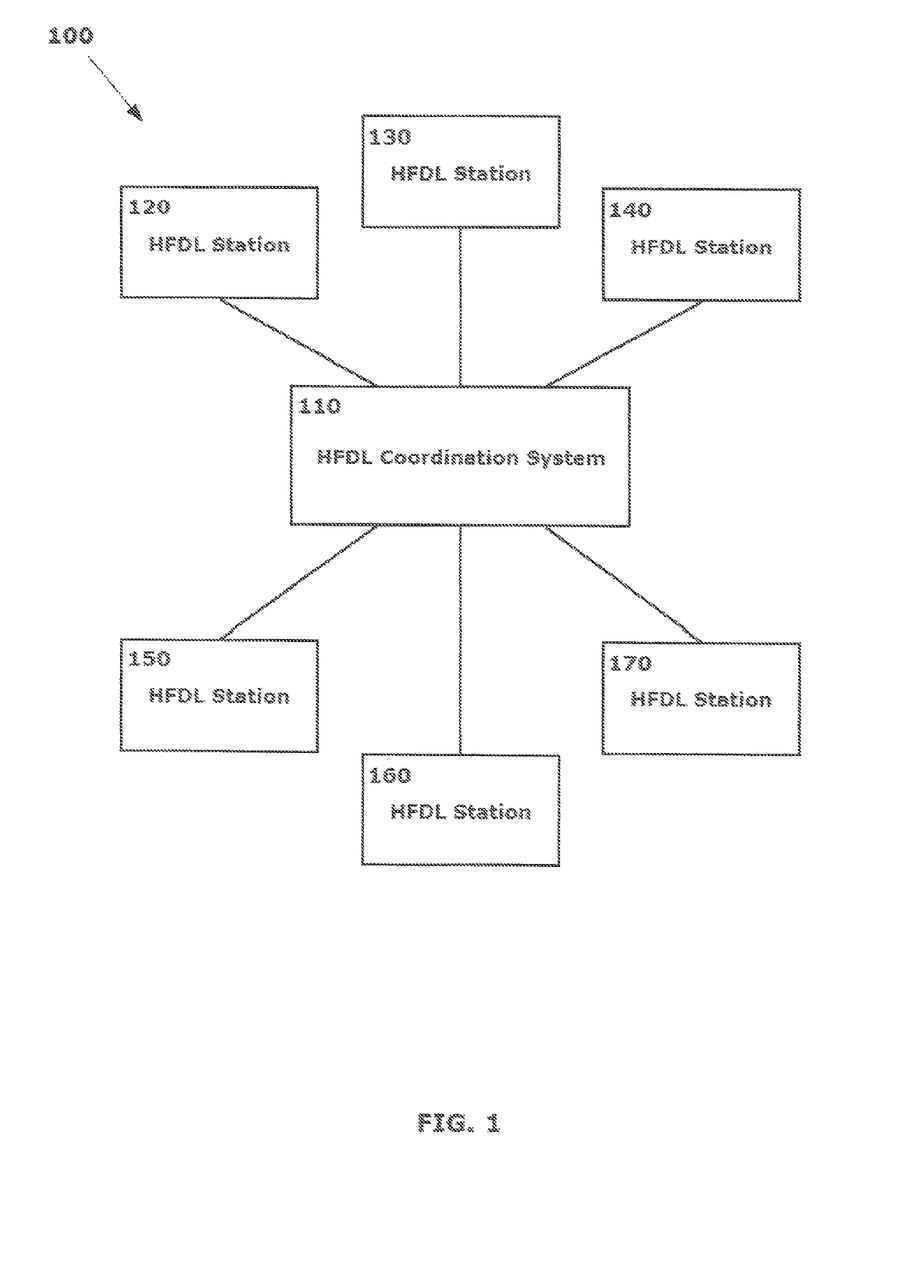
FIG. 1 illustrates a block diagram of an exemplary overview of an HFDL communication network system within which the systems and methods according to this disclosure may be effectively operated to improve communication fidelity.

FIG. 1 illustrates a block diagram of an exemplary overview of an HFDL communication network system 100 within which the systems and methods according to this disclosure may be effectively operated to improve communication fidelity. As shown in FIG. 1, the exemplary HFDL communication network system 100 may include at least one HFDL coordination system 110 which may communicate with a plurality of individual HFDL (ground) stations 120-170 worldwide to facilitate HFDL communications from those HFDL ground stations to participating aircraft. The at least one HFDL coordination system 110 may be used to collect information to support an AFT generation scheme, process the collected information in a manner that is usable by the AFT generation scheme, generate a scheduled and/or emergency AFT based on forecast and non-forecast environmental, atmospheric and solar conditions as well as operating states of the one or more HFDL (ground) stations 120-170, and disseminate the generated AFT to the plurality of HFDL (ground) stations 120-170. No particular architecture for the one or more communication links between the HFDL coordination system 110 and the plurality of HFDL (ground) stations 120-170 is to be implied by the depiction in FIG. 1. Virtually any available communication medium by which information may be received by the HFDL coordination system 110 and disseminated to the HFDL (ground) stations 120-170 is contemplated.

Various exemplary methods may be employed to generate the aggregate best frequency group selection or AFT for use by the HFDL communication network system during a particular time window. Since the evolution of HFDL service, historic frequency data has been archived in the form of old AFTs stored in an archive database. This includes both regular AFTs, based on forecast conditions, as well, as storm-type "emergency" AFTs that had to be generated based on emergent non-forecast conditions. These stored old AFTs may be usable to aid in generating current AFTs. Historic atmospheric data may be used to generate a current AFT. Real time atmospheric data, such as that available from Space Weather Prediction Center, may be used to generate the current AFT according to the scheme described in greater detail below. The real-time atmospheric data may include, but is not limited to, ongoing and recent geomagnetic storms, solar radiation storms, radio blackouts and the like.

The disclosed scheme may commence with determining, for each individual HFDL ground station, those environmental, atmospheric, and/or solar conditions that may affect HF energy propagation from the each individual HFDL ground station according to an upcoming schedule. A search algorithm may be applied in a manner that reviews stored or otherwise available historical data to compare environmental, atmospheric, or solar conditions at a previous particular point in time when those conditions were comparable to the currently-measured or currently-forecast environmental, atmospheric, and solar conditions. Having determined that previous particular point in time when comparable conditions existed, the algorithm may then reference stored historical information regarding AFTs to determine a particular AFT that was effectively employed at the previous particular point in time under the comparable atmospheric conditions. That AFT may be used to establish at least an appropriate frequency plan for each individual HFDL ground station under the currently-measured or currently-forecast conditions.

Once the appropriate frequency plan is determined for each individual HFDL ground station, other weighting factors may be applied in a separate multi-variable algorithm to optimize an overall AFT for the network of the plurality of HFDL ground stations. Such a multi-variable algorithm may take into account, for example, a projected aircraft traffic density in a particular region covered by one or more HFDL ground stations to maximize productivity to a largest population of participating aircraft at any given time. Overall system effectiveness and efficiency may be realized by transmitting data via a particular group of HFDL ground stations that may be in contact with a largest user population of aircraft. The AFT may be modified to ensure that, among competing requirements for a single best frequency to address atmospheric conditions in a number of regions, the region with the largest projected participating aircraft population density may be scheduled in priority to employ the single best frequency. As an illustrative example, consider that a single best frequency for the HFDL ground station at the South Pole is the same as the single best frequency for an HFDL ground station covering Japan. Because more aircraft traffic will traverse the region covered by the HFDL ground station covering Japan, the particular single best frequency may be appropriately allotted to the HFDL ground station covering Japan, unless it is determined, for example, that transmitting from both the South Pole station in the Japan station on the single best frequency will not raise interference issues between the participating HFDL ground stations.

Aircraft population density and volume information related to participating aircraft traffic through the HFDL communication network system may be collected and archived. This information may be principally archived by the individual HFDL ground stations themselves and referenced by the HFDL coordination system, as appropriate, to provide the weighting factors for the multi-variable algorithm described above. Traffic volume, density and capacity data may be thus readily available to aid in generating the AFT according to the above discussion.

Airline traffic, in the aggregate, can be predicted to a large extent. This prediction may be based on the aggregate of several sources such as commercial airline schedules, actual traffic data (such as Aircraft Situation Display to Industry or ASDI feeds), historical performance of the HFDL communication network system and a number of other candidate sources. Given this predictive information, when actual performance at a given HFDL ground station is taken into consideration and combined with the actual performance at neighboring HFDL ground stations, conclusions may be drawn as to the effectiveness of selected frequency scheme as it relates to each of the HFDL ground stations. From such an assessment, changes may be made to obtain optimal frequency selections for each of the HFDL ground stations in support of an overall network-wide frequency plan or AFT. This review and evaluation process may be undertaken in real time or may be predictive. Further considerations based on, for example, aircraft traffic locations and the geographic location of the selected HFDL ground station may allow additional performance information to be ascertained that may be used to assess relative frequency performance. Each of these available information sources may be tapped to provide inputs to the multi-variable algorithm that refines the basic AFT in support of generating a final AFT that accounts for known predicted environmental, atmospheric, and solar conditions as well as known predicted operating conditions for the plurality of HFDL ground stations and the participating aircraft with which each one of the HFDL ground stations is anticipated to communicate in a particular scheduled timeframe.

In embodiments, the multi-variable algorithm may take into account an overall volume of data to be transmitted in a particular region. Different HFDL ground stations may have different costs for transfer of bulk data associated with them. Given an option, therefore, the multi-variable algorithm may apply weighting factors that are based on forwarding larger volumes of bulk data, when given a choice, via the more cost-effective of the HFDL ground stations. These weighting factors, like the aircraft traffic density weighting factors described above, may prioritize a single best available frequency for more than one particular HFDL ground station to the one of those HFDL ground stations that will most economically transfer the larger volume of bulk data.

The disclosed scheme provides options for addressing outages at one or more HFDL ground stations, and unforeseen changes in the environmental, atmospheric, and/or solar conditions to provide an update to the AFT to be presented "on-call" or under "emergency" conditions. When such emergent conditions are encountered, the multi-variable algorithm may be modified to account for the emergent conditions and reapplied to the basic frequency laydown for the individual HFDL ground stations to arrive at an updated, on-call or emergency AFT.

In embodiments, the disclosed AFT generating procedures may be modified to use one or more of the HFDL ground stations as a type of a sounding transmitter and one or more of the other HFDL ground stations as one or more sounding receivers. In this manner, actual propagation data for a given set of environmental, atmospheric, and/or solar conditions may be provided as additional inputs, for example, to the multi-variable algorithm to generate and/or refine and AFT, and also may be provided to a database of historical information that may be referenced in the manner described above to generate the basic AFT in the future. The use of one or more of the HFDL ground stations as one of a station to station sounding transmitter or sounding receiver may require a brief interruption to the HFDL communication service. Station to station sounding may be done multiple times during the 24-hour period. Precision calibrated receivers may be used for this purpose. The received signal strength data may be used to determine a best propagating frequency for a region in which one of the HFDL ground stations used for the soundings is located.

In the same or separate embodiments, the disclosed AFT generating procedures may be modified to use one or more of the HFDL ground stations as a sounding transmitter and one or more cooperating aircraft in communication with the one or more HFDL ground stations as a sounding receiver. As with the station to station sounding scheme discussed above, this station to aircraft sounding scheme may require a brief interruption to the HFDL communication service. Station to aircraft sounding may be done multiple times during the 24-hour period. The received signal strength data reported by the aircraft may be used to determine a best propagating frequency for a region in which the ground station used for the soundings is located.

In embodiments, precision calibrated HF receivers may be installed at an HFDL ground station site to monitor transmissions from aircraft. The received signal strength data reported by these precision calibrated HF receivers may be used to determine a best propagating frequency for a region in which the ground station with the precision calibrated HF receivers are installed is located.

In embodiments, frequency use information available from HF air-to-ground voice service may be used to generate AFT.

As part of the HFDL communication protocol, aircraft regularly and periodically provide observed signal quality information in downlink data messages to the HFDL communication network system. This information can be used to assess relative performance of current frequency selections in each of the participating HFDL ground stations collecting this information. With this information in hand, improved AFTs may be generated.

Due to the nature of the HFDL communication network system, aircraft make informed decisions as to which HFDL ground station to select based on propagation efficiency. The informed decision may be influenced by a number of factors including transmit frequency and location of the HFDL ground station. Where the coverage from various HFDL ground stations can overlap, as in the case of the HFDL communication network system, every location worldwide may have HFDL coverage provided by at least three stations, choices based on merit being made. If one considers the choice made by an aircraft to request to join a particular HFDL ground station over another, information as to the quality of the frequency selection for a given HFDL ground station may be ascertained. Given this information, an optimizer could tune to frequencies and optimize HFDL communication network system performance.

The disclosed processes may combine two or more of the above-discussed data sources and/or processes to divine a most appropriate frequency selection solution.

Figure 2:
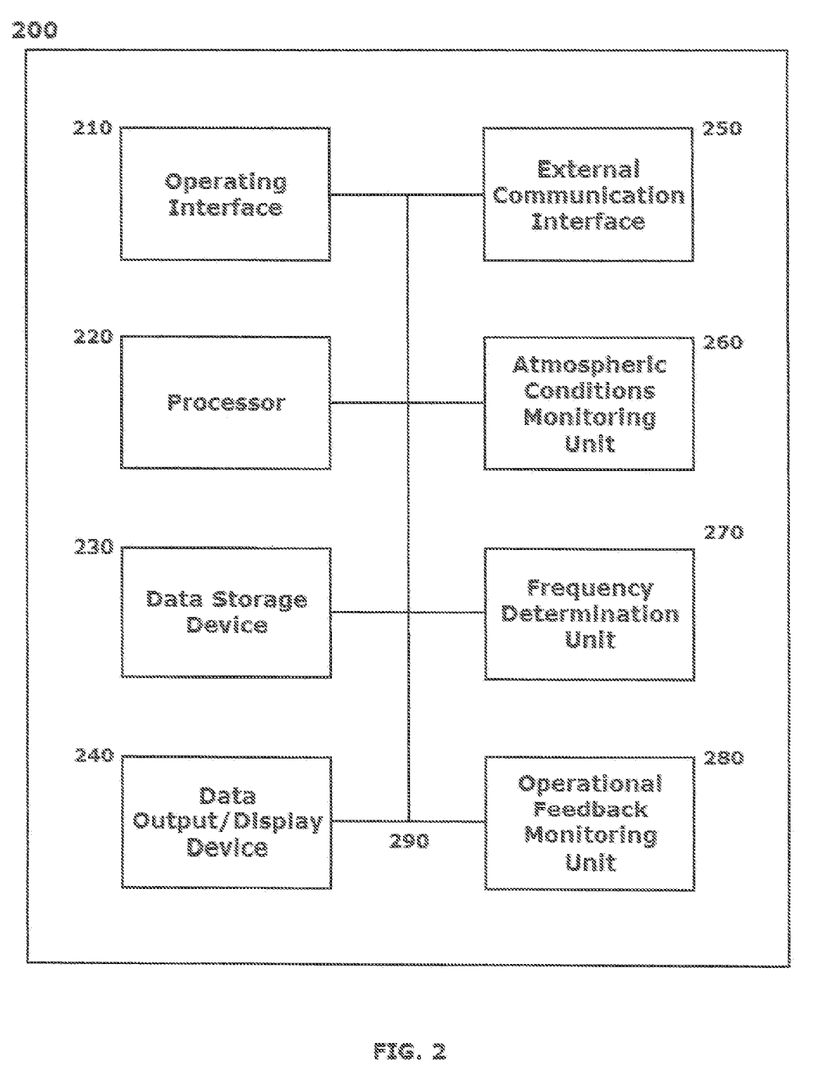
FIG. 2 illustrates a block diagram of an exemplary system for generating and/or refining an AFT for HFDL communication network system operations, and for disseminating the generated and/or refined AFT to a plurality of HFDL ground sites for implementation, according to this disclosure.

FIG. 2 illustrates a block diagram of an exemplary system 200 for generating and/or refining an AFT for HFDL communication network system operations, and for disseminating the generated and/or refined AFT to a plurality of HFDL ground sites for implementation, according to this disclosure. The exemplary system 200 shown in FIG. 2 may constitute, for example, a component of an HFDL coordination system such as that shown in FIG. 1.

The exemplary system 200 may include an operating interface 210 by which a user may communicate with the exemplary system 200, or otherwise by which the exemplary system 200 may receive instructions input to it from another source. In instances where the operating interface 210 may be a locally accessible user interface, the operating interface 210 may be configured as one or more conventional mechanisms common to computing and/or image forming devices that permit a user to input information to the exemplary system 200. The operating interface 210 may include, for example, a conventional keyboard and mouse, a touchscreen with "soft" buttons or with various components for use with a compatible stylus, a microphone by which a user may provide oral commands to the exemplary system 200 to be "translated" by a voice recognition program, or other like device by which a user may communicate specific operating instructions to the exemplary system 200.

The exemplary system 200 may include one or more local processors 220 for individually operating the exemplary system 200 and for carrying out data collection, processing, assessment and control functions. Processor(s) 220 may include at least one conventional processor or microprocessor that interprets and executes instructions to direct specific data collection, monitoring and storage functions with regard to current and/or forecast environmental, atmospheric, and solar conditions, as well as operating conditions for each of the HFDL ground stations that constitute the HFDL communication network system, in support of AFT generation within the exemplary system 200. Processor(s) 220 may initiate and control of certain data collection, analysis and AFT generation efforts of the exemplary system 200, or may otherwise direct an update of the AFT disseminated to the plurality of HFDL ground stations as shown in FIG. 1.

The exemplary system 200 may include one or more data storage devices 230. Such data storage device(s) 230 may be used to store data or operating programs to be used by the exemplary system 200, and specifically the processor(s) 220. Data storage device(s) 230 may be used to collect information regarding any or all of the functions of the exemplary system 200, as described above. The data storage device(s) 230 may include a random access memory (RAM) or another type of dynamic storage device that is capable of storing collected information, and separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary system 200, or may be provided external to, and in wired or wireless communication with, the exemplary system 200.

At least one of the data storage device(s) 230 may be specifically configured as a repository for one or more of archived historical AFTs and archived historical atmospheric and operating data that corresponds to the archived historical AFTs.

The exemplary system 200 may include at least one data output/display device 240 which may be configured as one or more conventional mechanisms that output information to a user, including a display screen on a computing device. The data output/display device 240 may be usable to display to a user an indication of a generated AFT, or selectable information that may be used to manipulate the disclosed AFT generation process.

The exemplary system 200 may include one or more separate external communication interfaces 250 by which the exemplary system 200 may communicate with components external to the exemplary system 200, such as the network of HFDL ground stations shown in FIG. 1. The external communication interfaces 250 may also be used to gather inputs from numerous sources in support of the data collection effort regarding current and/or forecast environmental, atmospheric, and solar conditions, participating aircraft scheduling, non-environmental operating conditions for the HFDL ground stations, and other appropriate data that may be considered by the multi-variable algorithm to generate and/or refine an AFT. The external communication interface 250 may be configured specifically to facilitate communication with the data sources by any available communication link including, but not limited to, radio communications, satellite communications, Internet communications, and the like. No particular limiting configuration to the external communication interface 250 is to be implied by the depiction in FIG. 2, other than that the external communication interface 250 may be configured to connect to any one or more available communication links.

The exemplary system 200 may include at least one or more of an atmospheric conditions monitoring (and/or data collection) unit 260, a frequency determination (or AFT generation/revision) unit 270 and an operational feedback (or HF radio wave propagation) monitoring unit 280. Each of units 260-280 may be a part, or a function, of processor 220 coupled to, for example, one or more storage devices 230, or may be separate stand-alone component modules or circuits in the exemplary system 200.

The atmospheric conditions monitoring unit 260 may communicate with sensors worldwide by a number of communication has including via the Internet to determine current and forecast environmental, atmospheric and/or solar conditions that may be used as inputs to the other devices and units in the exemplary system 200 in support of AFT generation.

The frequency determination unit 270 may apply collected environmental, atmospheric and/or solar conditions to a historical database using a particular algorithm for searching comparison of the historical database to arrive at a set of comparable environmental, atmospheric and/or solar conditions that may have existed in a vicinity of a particular one or more of the HFDL ground stations. The algorithm may then searching historical AFT database stored, for example, in one or more data storage devices 230 to select one or more AFTs that were effectively employed under comparable conditions in the past. In this manner, a basic (or final) AFT may be established for dissemination to the plurality of HFDL ground stations for implementation. Separately, the frequency determination unit 270 may apply a separate multi-variable algorithm to the basic AFT according to known or predicted operational constraints, as discussed above, to arrive at the final AFT for dissemination to the plurality of HFDL ground stations for implementation.

The operational feedback monitoring unit 280 may receive input via the external communication interface 250 regarding measured or observed HF radio wave propagation using one or more of the data sources and/or sounding methods described in detail above, and may also receive input from one or more sources regarding actual network system performance including through direct reporting from each of the participating HFDL ground stations. These received inputs via the operational feedback monitoring unit 280 may be used as additional input to the frequency determination unit 272 update a final AFT or to produce an emergency the AFT when conditions warrant. Additionally, the received inputs via the operational feedback monitoring unit 280 may be stored in a modifiable historic database to provide additional data points that may be employed by the first algorithm in a next pass through the historical database to determine a next basic AFT based on measured or forecast environmental, atmospheric, and solar conditions.

All of the various components of the exemplary system 200, as depicted in FIG. 2, may be connected by one or more data/control busses 290. These data/control busses 290 may provide wired or wireless communication between the various components of the exemplary system 200, whether all of those components are housed integrally in, or are otherwise external and connected to, the exemplary system 200.

It should be appreciated that, although depicted in FIG. 2 as an integral unit, the various disclosed elements of the exemplary system 200 may be arranged in any combination of sub-systems as individual components or combinations of components, integral to a single unit, or external to, and in wired or wireless communication with the single unit of the exemplary system 200. In other words, no specific configuration as an integral unit or as a support unit is to be implied by the depiction in FIG. 2. Further, although depicted as individual units for ease of understanding of the details provided in this disclosure regarding the exemplary system 200, it should be understood that the described functions of any of the individually-depicted components may be undertaken, for example, by one or more processors 220 connected to, and in communication with, one or more data storage devices 230.

Figure 3:
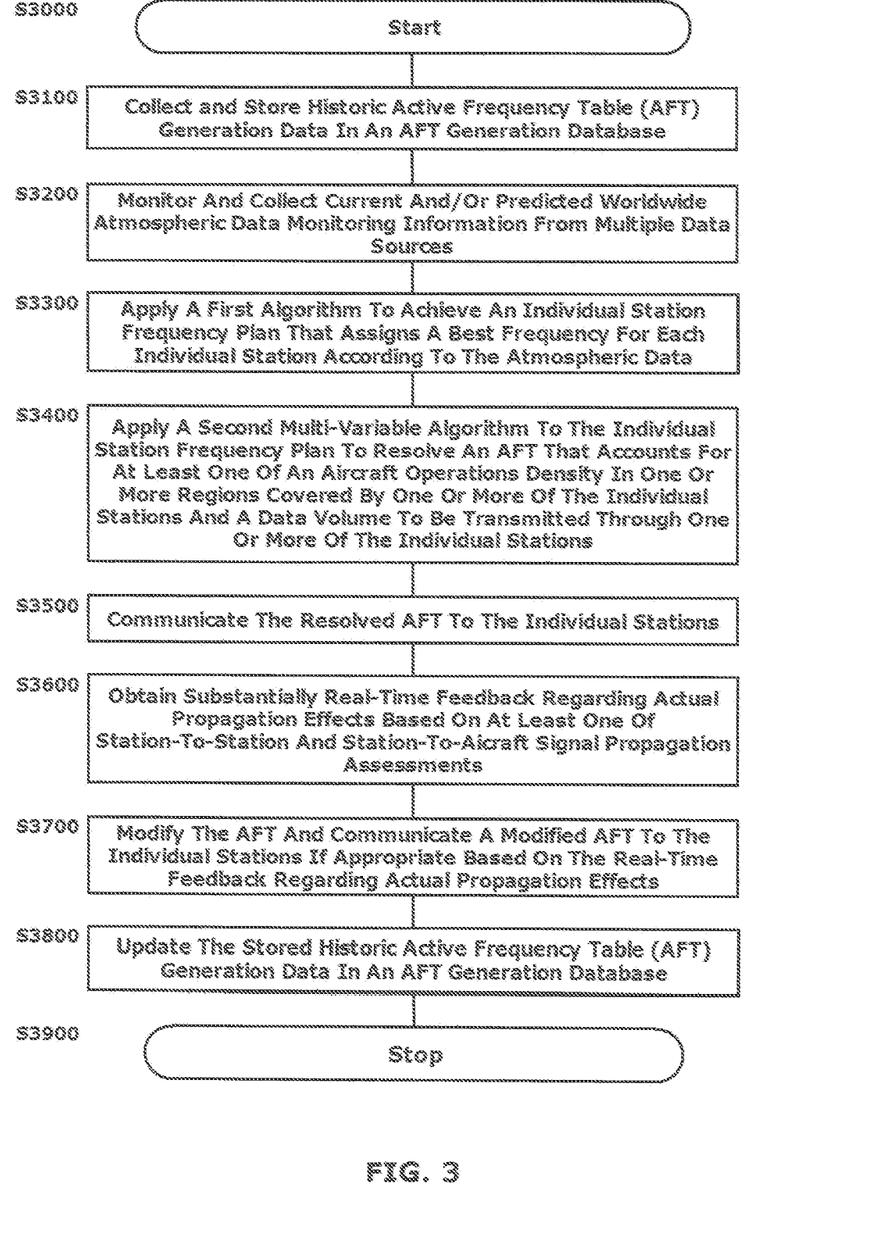
FIG. 3 illustrates a flowchart of an exemplary method for generating and/or refining an AFT for HFDL communication network system operations, and for disseminating the generated and/or refined AFT to a plurality of HFDL ground sites for implementation, according to this disclosure.

The disclosed embodiments may include an exemplary method for generating and/or refining an AFT for HFDL communication network system operations, and for disseminating the generated and/or refined AFT to a plurality of HFDL ground sites for implementation. FIG. 3 illustrates a flowchart of such an exemplary method. As shown in FIG. 3, operation of the method commences at Step S3000 and proceeds to Step S3100.

In Step S3100, historic AFT generation data, and a record of historic AFTs may be collected (or continue to be collected) and stored in a sortable AFT generation database for future use. Operation of the method proceeds to Step S3200.

In Step S3200, current and/or predicted worldwide atmospheric data, regarding known current or forecast environmental, atmospheric and solar conditions that may affect the operations of each of the HFDL ground stations comprising an HFDL communication networks system may be monitored and collected from multiple available proprietary and non-proprietary data sources in support of providing inputs to an automated AFT generation algorithm. Operation of the method proceeds to Step S3300.

In Step S3300, armed with certain historical, current observed and/or measured, and/or forecast data regarding environmental, atmospheric and solar conditions varyingly affecting components of the HFDL communication network system, a first algorithm or determination scheme may be applied to that data to provide at least a best frequency, from a list of licensed frequencies, for each individual station according to that data. A result of Step S3300, may be the production of what may be considered a first or basic AFT for the HFDL communication network system. As part of the first algorithm, a frequency deconfliction step may be included at least based on a rudimentary priority assigned to each HFDL ground station. Operation of the method proceeds to Step S3400.

In Step S3400, additional collected data regarding limitations on operations of one or more of the HFDL ground stations, a prospective regional air traffic density in relation to one or more of the HFDL ground stations, and/or an evaluation of a total volume of data to be pushed through one or more of the HFDL ground stations, among other operating and scheduling characteristics, may be provided as inputs to a second multi-variable algorithm which may be applied to an individual station frequency plan arrived at to application of the first algorithm or a basic AFT to account for these other variables when determining an optimized frequency mix based on these other operating conditions to produce a final, more fine-grained AFT or, for example, to revise a previously-promulgated AFT based on unforeseen changes in any one or more of the characteristics that form inputs to either the first algorithm or the second multi-variable algorithm. Operation of the method proceeds to Step S3500.

In Step S3500, a resolved AFT may be output to the individual HFDL ground stations comprising the HFDL communication network system to which the AFT applies. Operation of the method proceeds to Step S3600.

In Step S3600, in conjunction with executing the received AFT, one or more of the HFDL ground stations may execute, randomly or at preplanned intervals, a station-to-station, or a station-to-aircraft sounding scheme to obtain an indication of an actual HF radio wave propagation according to current conditions. Separately, feedback may be received from aircraft systems in support of the station-to-aircraft sounding scheme or an aircraft-to-station sounding scheme to provide the indication of the actual HF radio wave propagation observed according to current conditions. Operation of the method proceeds to Step S3700.

In Step S3700, information obtained as the substantially real-time feedback may be used to update the inputs to the second algorithm in support of refining, updating, or replacing the promulgated AFT based on observed and/or emergent conditions. Operation the method proceeds to Step S3800.

In step S3800, information obtained as the substantially real-time feedback, other information used as inputs to the first and second algorithms, and/or resultant AFTs may be used separately to update the historical database information regarding observed, atmospheric and operating conditions and the AFTs, including revised or modified AFTs that were used to address those specific conditions. Operation of the method proceeds to Step S3900, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in communicating network environments with many types of communication equipment and system configurations. Embodiments according to this disclosure may be practiced in distributed computing and communicating environments where tasks are performed by local and remote, actual and virtualized processing devices that may be linked to each other by hardwired links, wireless links, or a combination of both through a communication network. In a distributed computing/communicating environment, program modules may be located in both local and remote memory storage devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage devices that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 3, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method for generating an active frequency table (AFT) for a plurality of high frequency (HF) ground communication sites, comprising:
   collecting, with a processor, forecast atmospheric condition information in a vicinity of a plurality of HF ground communication sites;
   selecting, with the processor, a relatively best HF frequency to support HF radio wave propagation for communications with each of the plurality of HF ground communication sites from separate sets of discrete licensed HF frequencies for the each of the HF ground communication sites, the selecting comprising:
      isolating a past time frame in which atmospheric conditions in the vicinity of at least one of the plurality of HF ground communication sites were comparable to the collected forecast atmospheric condition information in the vicinity of the at least one of the plurality of HF ground communication sites;
      determining a past relatively best HF frequency that was employed by the at least one of the plurality of HF ground communication sites during the past time frame; and
      setting that past relatively best HF frequency as the relatively best HF frequency to support the HF radio wave propagation for communications with the at least one of the plurality of HF ground communication sites;
   deconflicting, with the processor, potential interference between the selected relatively best HF frequency for at least one of the plurality of HF ground communication sites and the selected relatively best HF frequency for others of the plurality of HF ground communication sites;
   generating, with the processor, the AFT for the plurality of HF ground communication sites based on results of the selecting and the deconflicting; and
   transmitting the generated AFT to the plurality of HF ground communication sites for implementation.

2. The method of claim 1, the determining the past relatively best frequency that was employed by the at least one of the plurality of HF ground communication sites during the past time frame comprising consulting a database of stored archived AFTs for past time frames.

3. The method of claim 1, the collecting the forecast atmospheric condition information comprising collecting data from multiple sources regarding at least one of environmental, atmospheric, and solar conditions affecting HF radio wave propagation in a vicinity of at least one of the plurality of HF ground communication sites.

4. The method of claim 3, at least one of the multiple sources being Space Weather Prediction Center.

5. The method of claim 1, further comprising:
   collecting, with the processor, operating parameters for the plurality of HF ground communication sites;
   prioritizing the plurality of HF ground communication sites in a rank order according to the collected operating parameters;
   selecting, with the processor, the relatively best HF frequency for the one of the plurality of HF ground communication sites that is highest in the rank order; and
   selecting relatively next inferior HF frequencies for the ones of the plurality of HF ground communication sites that are lower in the rank order.

6. The method of claim 5, the operating parameters for the plurality of HF ground communication sites including planned system outages, priority in the rank order being given to the one of the plurality of HF ground communication sites that is anticipated to experience the fewest planned system outages.

7. The method of claim 5, the operating parameters for the plurality of HF ground communication sites including an anticipated aircraft population density communicating with each of the plurality of HF ground communication sites, priority of the rank order being given to the one of the plurality of HF ground communication sites that is anticipated to support the greatest anticipated aircraft population density.

8. The method of claim 5, the operating parameters for the plurality of HF ground communication sites including an anticipated volume of digital data to be transmitted through the plurality of HF ground communication sites, priority of the rank order being given to the one of the plurality of HF ground communication sites that is anticipated to support the highest volume of digital data.

9. The method of claim 8, the operating parameters for the plurality of HF ground communication sites further including a cost associated with the transmission of bulk digital data through the plurality of HF ground communication sites, priority of the rank order being given to the one of the plurality of ground communication sites that is anticipated to support the highest volume of digital data at the lowest overall cost.

10. The method of claim 1, further comprising:
   receiving, with the processor, an indication of observed HF radio wave propagation in the vicinity of at least one of the plurality of HF ground communication sites;
   applying, with the processor, information regarding the indication of the observed HF radio wave propagation in the vicinity of the at least one of the plurality of HF ground communication sites to update the AFT for the plurality of HF ground communication sites; and
   transmitting the updated AFT to the plurality of HF ground communication sites for implementation.

11. The method of claim 10, the indication of the observed HF radio wave propagation in the vicinity of the at least one of the plurality of HF ground communication sites being based on a station-to-station sounding scheme executed between the at least one of the plurality of HF ground communication sites and another one of the plurality of HF ground communication sites.

12. The method of claim 10, the indication of the observed HF radio wave propagation in the vicinity of the at least one of the plurality of HF ground communication sites being based on a station-to-aircraft sounding scheme executed between the at least one of the plurality of HF ground communication sites and at least one participating aircraft in communication with the at least one of the plurality of HF ground communication sites.

13. The method of claim 10, the indication of the observed HF radio wave propagation in the vicinity of the at least one of the plurality of HF ground communication sites being based on an aircraft-to-station sounding scheme executed between at least one participating aircraft in communication with the at least one of the plurality of HF ground communication sites and the at least one of the plurality of HF ground communication sites.

14. The method of claim 10, the indication of the observed HF radio wave propagation in the vicinity of the at least one of the plurality of HF ground communication sites being based on an evaluation of a fidelity of HF voice communication between participating nodes in a vicinity of the at least one of the plurality of HF ground communication sites.

15. A system for generating an AFT for a plurality of HF ground communication sites, comprising:
   an external communication interface that collects forecast atmospheric condition information in a vicinity of a plurality of HF ground communication sites from multiple available sources with which the external communication interface is in communication;
   a frequency selection device that selects a relatively best HF frequency to support HF radio wave propagation for communications with each of the plurality of HF ground communication sites from separate sets of discrete licensed HF frequencies for the each of the HF ground communication sites, the selecting comprising:
      isolating a past time frame in which atmospheric conditions in the vicinity of at least one of the plurality of HF ground communication sites were comparable to the collected forecast atmospheric condition information in the vicinity of the at least one of the plurality of HF ground communication sites;
      determining a past relatively best HF frequency that was employed by the at least one of the plurality of HF ground communication sites during the past time frame; and
      setting that past relatively best HF frequency as the relatively best HF frequency to support the HF radio wave propagation for communications with the at least one of the plurality of HF ground communication sites; and
   an AFT generation device that (1) deconflicts potential interference between the selected relatively best HF frequency for at least one of the plurality of HF ground communication sites and the selected relatively best HF frequency for others of the plurality of HF ground communication sites, and (2) generates the AFT for the plurality of HF ground communication sites,
   the external communication interface transmitting the generated AFT to the plurality of HF ground communication sites for implementation.

16. The system of claim 15, further comprising a storage device that stores a database of archived AFTs for past time frames, the frequency selection device selecting the relatively best HF frequency to support HF radio wave propagation by consulting the stored database of archived AFTs for past time frames.

17. The system of claim 15, the AFT generation device collecting information on operating parameters for the plurality of HF ground communication sites, prioritizing the plurality of HF ground communication sites in a rank order according to the collected operating parameters, assigning the relatively best HF frequency for the one of the plurality of HF ground communication sites that is highest in the rank order; and reassigning relatively next inferior HF frequencies to the ones of the plurality of HF ground communication sites that are lower in the rank order.

18. The system of claim 17, the operating parameters for the plurality of HF ground communication sites including at least one of (1) planned system outages, priority in the rank order being given to the one of the plurality of HF ground communication sites that is anticipated to experience the fewest planned system outages, (2) an anticipated aircraft population density communicating with each of the plurality of HF ground communication sites, priority of the rank order being given to the one of the plurality of HF ground communication sites that is anticipated to support the greatest anticipated aircraft population density, and (3) an anticipated volume of digital data to be transmitted through the plurality of HF ground communication sites, priority of the rank order being given to the one of the plurality of HF ground communication sites that is anticipated to support the highest volume of digital data.

19. The system of claim 15, the external communication interface receiving an indication of observed HF radio wave propagation in the vicinity of at least one of the plurality of HF ground communication sites, the AFT generation device applying information regarding the indication of the observed HF radio wave propagation in the vicinity of the at least one of the plurality of HF ground communication sites to update the AFT for the plurality of HF ground communication sites, and the external communication interface transmitting the updated AFT to the plurality of HF ground communication sites for implementation.

20. The system of claim 19, the indication of the observed HF radio wave propagation in the vicinity of the at least one of the plurality of HF ground communication sites being based on at least one of (1) a station-to-station sounding scheme executed between the at least one of the plurality of HF ground communication sites and another one of the plurality of HF ground communication sites, (2) a station-to-aircraft sounding scheme executed between the at least one of the plurality of HF ground communication sites and at least one participating aircraft in communication with the at least one of the plurality of HF ground communication sites, (3) an aircraft-to-station sounding scheme executed between at least one participating aircraft in communication with the at least one of the plurality of HF ground communication sites and the at least one of the plurality of HF ground communication sites, and (4) an evaluation of a fidelity of HF voice communication between participating nodes in a vicinity of the at least one of the plurality of HF ground communication sites.

21. A non-transitory computer readable medium on which is recorded instructions that, when executed by a processor, cause the processor to execute the steps of a method for generating an AFT for a plurality of HF ground communication sites, the method comprising:
   collecting forecast atmospheric condition information in a vicinity of a plurality of HF ground communication sites;
   selecting a relatively best HF frequency to support HF radio wave propagation for communications with each of the plurality of HF ground communication sites separate sets of discrete licensed HF frequencies for the each of the HF ground communication sites, the selecting comprising:
      isolating a past time frame in which atmospheric conditions in the vicinity of at least one of the plurality of HF ground communication sites were comparable to the collected forecast atmospheric condition information in the vicinity of the at least one of the plurality of HF ground communication sites;
      determining a past relatively best HF frequency that was employed by the at least one of the plurality of HF ground communication sites during the past time frame; and setting that past relatively best HF frequency as the relatively best HF frequency to support the HF radio wave propagation for communications with the at least one of the plurality of HF ground communication sites;

deconflicting potential interference between the selected relatively best HF frequency for at least one of the plurality of HF ground communication sites and the selected relatively best HF frequency for others of the plurality of HF ground communication sites;

generating the AFT for the plurality of HF ground communication sites based on results of the selecting and the deconflicting; and transmitting the generated AFT to the plurality of HF ground communication sites for implementation.

* * * * *